United States Patent [19]

Wang

[11] 4,066,604

[45] Jan. 3, 1978

[54] BRANCHED POLYPHENYLENE-MICA COMPOSITES

[75] Inventor: Chen-Shen Wang, Naperville, Ill.

[73] Assignee: Standard Oil Company (Indiana), Chicago, Ill.

[21] Appl. No.: 736,389

[22] Filed: Oct. 28, 1976

[51] Int. Cl.$^2$ ............................................. C08K 3/34
[52] U.S. Cl. ................................. 260/37 R; 106/291
[58] Field of Search ...................................... 260/37 R

[56] References Cited

U.S. PATENT DOCUMENTS

| | | | |
|---|---|---|---|
| 3,600,341 | 8/1971 | Schmidt | 260/37 R |
| 3,792,099 | 2/1974 | Wang et al. | 260/668 R |
| 3,971,748 | 7/1976 | Wang et al. | 260/37 R |
| 3,974,121 | 8/1976 | Wang | 260/37 R |

OTHER PUBLICATIONS

Deanin et al., Fillers and Reinforcements for Plastics, American Chemical Society, 1974, pp. 41–51.

*Primary Examiner*—James H. Derrington
*Attorney, Agent, or Firm*—Wallace L. Oliver; Arthur G. Gilkes; William T. McClain

[57] ABSTRACT

A composite formed at relatively low temperature from branched polyphenylene and mica exhibits excellent mechanical properties after heat aging.

10 Claims, No Drawings

BRANCHED POLYPHENYLENE-MICA COMPOSITES

BACKGROUND OF THE INVENTION

This invention relates to branched polyphenylene-mica composites which can withstand mechanical stress under high temperature conditions.

There is a need for polymeric materials which can withstand mechanical stress under high temperature conditions. Such materials have utility in applications such as in electronic circuit boards and in mechanical seals. Among the polymers which have shown good high temperature properties are branched polyphenylenes. In general, polyphenylenes are polymers composed essentially of carbon and hydrogen in aromatic ring type structures with the rings chemically linked to each other through the ortho, meta and para positions. Such polymers are to be distinguished clearly from other chemically similar phenylene type structures, such as polyphenylene oxide, polyphenylene sulfide, polyphenylene sulfone and other polymers containing the designation "phenylene". Ordinary polyphenylenes generally have been produced by techniques such as acid catalyzed oxidative coupling of the benzene ring in various aromatic compounds and such polyphenylenes possess some degree of high temperature thermal stability, but they are generally linear (para-polyphenylene) polymers which are relatively insoluble and infusable. Polyphenylenes have been produced which do possess certain limited solubility, but these have generally been at number average molecular weights of only about 1000 to 2000. Generally, these low molecular weight polyphenylenes contain only a low degree of branching, that is, they are still relatively linear polymers which contain long linear segments.

The branched polyphenylenes useful in producing superior mica composites are those novel polyphenylenes disclosed by Wennerberg and Wang in U.S. Pat. No. 3,792,099 and produced by the process described in U.S. Pat. Nos. 3,829,518 and 3,798,281, all of which are incorporated by reference herein. These polyphenylenes possess increased solubility over prior art polyphenylenes and excellent thermal stability over a number average molecular weight range from 1000 to over 10,000. Also, small amounts of branched nitropolyphenylene can be incorporated within the composites of this invention. Such nitropolyphenylenes and composites formed therefrom are described in U.S. Pat. No. 3,974,121, which is incorporated by reference herein.

SUMMARY OF THE INVENTION

A composite formed from a mixture comprising from about 50 to 90 wt. % mica and about 10 to 50 wt. % branched polyphenylene exhibits excellent mechanical properties, especially after heat aging.

BRIEF DESCRIPTION OF THE INVENTION

Although branched polyphenylene along with glass and asbestos composites with branched polyphenylene show good thermal properties, there is a need for better materials in applications such as in electronic circuit boards. Glass and asbestos composites with branched polyphenylene usually require a crosslinking agent such as nitropolyphenylene which adversely affects the heat aging properties of the material. Further, branched polyphenylene-asbestos composites generally are formed at an inconvenient high temperature around 950° F.

Surprisingly, the disadvantages of asbestos and glass composites are overcome in branched polyphenylene-mica composites. Composites formed from mica and branched polyphenylenes exhibit excellent mechanical properties, especially after heat aging. Although crosslinking agents such as nitropolyphenylene can be used in such composites, they are unnecessary. The mica composites can be formed at temperatures around 650° F. The composites of this invention are prepared from about 50 to 90 wt. % mica and about 10 to 50 wt. % branched polyphenylene.

Branched polyphenylene useful in this invention should have at least about 8% by weight of its benzene ring structures bonded to three or more other benzene ring structures, that is, it should be at least 8% branched. Such branched polyphenylene can also be characterized by the relative amounts of the linear infrared absorbance spectrum integrated peak area within the frequency range 726–930 cm$^{-1}$. In general, about 7 to 18%, preferably 10 to 18%, of the total integrated peak area within the frequency range 726–930 cm$^{-1}$ should fall within the frequency range 854–930 cm$^{-1}$ (I region). The frequency range 806–853 cm$^{-1}$ (P region) generally accounts for about 15 to 30%, preferably 18 to 26%, of the total integrated peak area. The frequency range 778–805 cm$^{-1}$ (M region) accounts for about 13 to 20% of the total integrated peak area.

Branched polyphenylene alternatively can be characterized by the amount of the various types of benzene ring structures present in the polymer chains, which is determined according to the following equation: $c = A/b\, a^*$. In this equation the term "A" is the planimeter area reading for the particular absorption frequency range corrected by a constant factor relating to the planimeter used in the measurement and is in units of cm$^{-1}$. The values of A for the region between 845 and 930 cm$^{-1}$ are corrected for the presence of meta-disubstituted benzene ring structures by applying a correction factor obtained from the value of A for the region 778–805 cm$^{-1}$. The correction factor is one-third of the A value for the 778–805 cm$^{-1}$ region. The term "b" is the thickness of the KBr pellet in units of cm. The term "$a^*$" is the integrated absorptivity in units of g$^{-1}$ l cm$^{-2}$. The values for $a^*$ are obtained from the integrated peak areas of the reference compounds determined under essentially the same operating conditions used for obtaining the spectra for the polyphenylenes. The term "c" is the concentration, in grams per liter, of any of the characteristic benzene ring structures associated with the regions I, P, M and PH. The amount of the various types of benzene ring structures present in the polymer chain is determined by dividing the measured concentration obtained from a particular frequency rang by the sum of the concentrations obtained from the four frequency ranges involved. Further details of this procedure are described in U.S. Pat. No. 3,792,099.

By the above-described analysis, the amount of benzene ring structures in the branched polyphenylene polymer chains which are at least trisubstituted, that is, bonded to three or more other benzene ring structures, is at least about 8% by weight, preferably 10% by weight and is more preferably from about 12 to about 25 percent by weight. The amount of benzene ring structures which are disubstituted, bonded to two other benzene ring structures through either the para, meta, or ortho positions, is preferably from about 45 to about 65 percent by weight. The amount of benzene ring structures which are meta-disubstituted, bonded through the meta position to two other benzene ring structures, is preferably from about 15 to about 35 percent by weight. The terminology "double bonding through the meta position" refers to the bonding of a benzene ring structure to two other benzene ring structures through the meta positions of the benzene ring structure. The remaining benzene ring structures in the polymer chains are bonded to only one other benzene ring structure.

The inherent viscosity of the branched polyphenylenes can vary from about 0.025 or less to more than 0.17 when measured in trichlorobenzene at 135° C at a concentration of 0.02 g/ml. This roughly corresponds to a number average molecular weight range of from 1000 or less to greater than 10,000. A number average molecular weight range of about 3,000 to 10,000 is particularly advantageous for the preparation of the nitropolyphenylenes used with this invention.

A particularly preferred branched polyphenylene resin is that prepared from biphenyl by the dehydrogenative coupling process described in U.S. Pat. Nos. 3,829,518 and 3,798,281.

Suitable composites are formed using from about 20 to 40 wt. % and preferably about 30 wt. % branched polyphenylene having an inherent viscosity ranging from about 0.05 to 0.12 and preferably about 0.07.

Branched polyphenylene can be converted to branched nitropolyphenylene useful in this invention by a nitration reaction. A suitable nitration reaction consists of the addition of a mixed nitric acid and sulfuric acid nitrating agent to a solution consisting of the branched polyphenylene, water and sulfuric acid. This reaction is preferably conducted at from 0° C to 50° C for from 3 hours to 10 hours, more preferably from about 5°–15° C for about 2 to 4 hours followed by a few hours at a temperature of about 30°–50° C The branched nitropolyphenylenes which can be incorporated within composites of this invention also contain at least 0.25 percent by weight of nitrogen and at least about 0.58 percent by weight of oxygen. The nitropolyphenylenes exhibit infrared absorbance at both 1345 cm$^{-1}$ and 1525 cm$^{-1}$ which indicate the presence of nitro groups. Preferably, the branched nitropolyphenylene will have a softening point between 150° C and 350° C, and it will contain at least 0.5 percent nitrogen and at least 1.15 percent oxygen, and no more than about 15 percent nitrogen and about 35 percent oxygen. More preferably, the amount of nitrogen contained in the polymer will be from 0.75 percent to 5 percent and most preferably from 1 to 4 percent.

Using the integrated peak area obtained from linear infrared absorption spectra for the region from about 600 cm$^{-1}$ to 1000 cm$^{-1}$, it has been determined that the branched nitropolyphenylene of this invention must have at least 8 percent of the linear infrared absorbance spectrum integrated peak area in the frequency range 726–930 cm$^{-1}$ within the I frequency range 865–930 cm$-1$. It is this type of absorption which is indicative of polymer chain branching.

Preferably, the total linear infrared absorbance spectrum integrated peak area within the frequency range 726–930 cm$^{-1}$ is distributed as follows: from 8 to 22%, most preferably from 12 to 20%, of the integrated peak area falls within the frequency range 865–930 cm$^{-1}$; from 20 to 45%, most preferably from 25 to 40% of the integrated peak area falls within the frequency range 806–864 cm$^{-1}$; from 7 to 20%, most preferably from 10 to 18%, of the integrated peak area falls within the frequency range 778–805 cm$^{-1}$; and the remainder of the integrated peak area within the frequency range 726–930 cm$^{-1}$ falls within the frequency range 726–777 cm$^{-1}$.

Preferably, the branched nitropolyphenylene has an inherent viscosity of at least 0.04 when measured in trichlorobenzene at 135° C. at a concentration of 0.02 g/ml. The number average molecular weights of the nitropolyphenylene range from as low as 1000 to greater than 10,000, and are preferably greater than about 4000.

The micas useful in this invention are a series of silicate minerals characterized physically as flat, six-sided monoclinic crystals which undergo a nearly perfect basal cleavage to yield thin, tough, flexible films. The actual chemical composition can vary over different micas. Phlogopite is preferred, but other natural and synthetic micas such as muscovite, biotite, fluorophlogopite and barium disilicate can be used. Micas are further described in Kirk-Othmer, Encyclopedia of Chemical Technology, Second Edition, Vol. 13, pp. 398–424, incorporated herein by reference.

The size of the mica particles useful in branched polyphenylene composites can vary from about −400 mesh to above 100 mesh. An average particle size about −325 mesh is preferred. Increasing the particle size does not yield better composite strengths and can hurt long term thermal stability.

The mechanical strength exhibited by polyphenylene-mica composites are comparable similar composites using asbestos, even though the necessary molding conditions for optimum properties are not as severe. Generally a molding temperature of about 600° F is sufficient for a mica composite, while temperatures up to about 950° F are necessary for asbestos composites. Although crosslinking agents such as nitropolyphenylene, sulphonated polyphenylene or silanes can be included in the composites of this invention at levels ranging up to about 10 wt. %, they are not required in constrast to glass-polyphenylene and low molecular weight polyphenylene-asbestos composites. Heat aging properties are improved if no such crosslinking agents are present.

Unlike graphite and carbon fiber composites using branched polyphenylenes, mica powder-polyphenylene composites can be prepared by dry molding, which is simpler, quicker and less expensive than the solvent casting method used in forming fiber composites and avoids any residual solvent in the final composite. A preferred method of preparation is to blend mica powder and branched polyphenylene in a Waring blender for at least 5 minutes. This blend is compacted into a pressing mold which is inserted into a well-ventilated, heated press. Useful molding conditions range from about 500° to 950° F at about 1600 to 800 p.s.i. for about 5 to 30 minutes.

Our invention is demonstrated but not limited by the following examples.

EXAMPLE I

Ten grams of polyphenylene powder (inherent viscosity = 0.07) and ten grams of mica powder (−325 mesh) were blended together and were placed in a 2 × 2.5 compression mold. The blend was formed into a composite by compression at 1000 p.s.i. (or 10 minutes) in a hydraulic press heated to 600° F. Composites containing asbestos felt and glass shorts were prepared in a similar manner. These results of mechanical property testing before and after heat aging for 14 days in air at 600° F are shown in Table I.

TABLE I

| Example (Run) | Reinforcing Material (%) | Branched Polyphenylene (%) | Nitropoly-phenylene (%) | Molding Conditions | | | Mechanical Properties (psi) | | | |
|---|---|---|---|---|---|---|---|---|---|---|
| | | | | Temp. (° F) | Pressure (psi) | Total Time (Minutes) | Flexural Strength | | Flexural Modulus | |
| | | | | | | | Before Aging | After Aging | Before Aging | After Aging |
| (A) | Asbestos Felt (61.3) | 9.3 | 29.4[1] | 950 | 3200 | 30 | 9400 | 8900 | 1,819,000 | 1,235,000 |
| (B) | Glass Shorts (60.5) | — | 39.5[2] | 950 | 1600 | 10 | 2200 | 4600 | 422,000 | 515,000 |
| I | Mica (Suzorite) (60) | 40 | — | 600 | 1000 | 10 | 3300 | 4900 | 1,944,000 | 1,197,000 |

[1]contains 2.3% nitrogen
[2]contains 1.3% nitrogen

EXAMPLE II–XXV

A series of branched polyphenylene-mica composites were prepared as described in Example I. The composites were molded at 1000 p.s.i. for 10 minutes using a 600° F heated mold. Heat aging was performed for 14 days at 600° F in air. The results are shown in Table II.

TABLE II

| Example | Branched Polyphenylene | | Mica (Suzorite) | | Mechanical Properties | | | |
|---|---|---|---|---|---|---|---|---|
| | | | | | Flexural Strength | | Flexural Modulus | |
| | wt. % | I.V. | Mesh | wt. % | Before Aging | After Aging | Before Aging | After Aging |
| II | 40 | 0.07 | 325<br>20 + 40 | 54<br>6 | 3300 | 2800 | 1,953,000 | 753,000 |
| III | 40 | 0.07 | 325<br>20 + 40 | 42<br>18 | 3000 | 2100 | 1,820,000 | 461,000 |
| IV | 40 | 0.07 | 325<br>20 + 40 | 30<br>30 | 3400 | 1600 | 2,372,000 | 499,000 |
| V | 40 | 0.06 | 325<br>20 + 40 | 54<br>6 | 3200 | 3000 | 2,020,000 | 706,000 |
| VI | 40 | 0.06 | 325<br>20 + 40 | 42<br>18 | 4000 | 1700 | 1,879,000 | 689,000 |
| VII | 40 | 0.06 | 325<br>20 + 49 | 30<br>30 | — | 3000 | — | 964,000 |
| VIII | 30 | 0.07 | 325 | 70 | 2300 | 1700 | 1,681,000 | 408,000 |
| IX | 40 | 0.07 | 325<br>100 + 200 | 42<br>18 | 3400 | — | 2,167,000 | — |
| X | 40 | 0.07 | 325<br>100 + 200 | 30<br>30 | 3700 | — | 2,182,000 | — |
| XI | 40 | 0.06 | 325<br>100 + 200 | 54<br>6 | 3000 | 200 | 1,927,000 | 92,000 |
| XII | 40 | 0.06 | 325<br>100 + 200 | 42<br>18 | 2500 | 300 | 2,254,000 | 99,000 |
| XIII | 40 | 0.06 | 325<br>100 + 200 | 30<br>30 | 3200 | 500 | 1,979,000 | 143,000 |
| XIV | 40 | 0.08 | 325<br>20 + 40 | 54<br>6 | 2900 | 1400 | 1,379,000 | 234,000 |
| XV | 40 | 0.08 | 325<br>20 + 40 | 42<br>18 | 3000 | 1600 | 1,814,000 | 373,000 |
| XVI | 40 | 0.08 | 325<br>20 + 40 | 30<br>30 | 3300 | 1200 | 1,843,000 | 250,000 |
| XVII | 40 | 0.06 | 325<br>100 | 42<br>18 | 3400 | — | 2,158,000 | — |
| XVIII | 40 | 0.06 | 325<br>100 | 30<br>30 | 4100 | — | 2,863,000 | — |
| XIX | 40 | 0.08 | 325<br>100 | 54<br>6 | 2900 | — | 2,234,000 | — |
| XX | 40 | 0.08 | 325<br>100 | 42<br>18 | 1900 | — | 1,280,000 | — |
| XXI | 40 | 0.08 | 325<br>100 | 30<br>30 | 3600 | — | 2,228,000 | — |
| XXII | 40 | 0.07 | 325<br>100 + 200 | 54<br>6 | 3500 | — | 2,184,000 | — |
| XXIII | 40 | 0.07 | 325 | 60 | 2600 | — | 1,537,000 | — |
| XXIV | 40 | 0.07 | 325 | 60 | 3200 | — | 1,632,000 | — |
| XXV | 30 | 0.07 | 325 | 60 | 2300 | — | 1,268,000 | — |

I claim:

1. A high temperature resistant composite comprising from about 50 to 90 wt. % mica and from about 10 to 50 wt.% branched polyphenylene having at least about 8% by weight of its benzene ring structures bonded to three or more other benzene ring structures.

2. The composite of claim 1 wherein the branched polyphenylene has an inherent viscosity ranging from about 0.025 to 0.17.

3. The composite of claim 2 wherein the branched polyphenylene has an inherent viscosity ranging from about 0.05 to 0.12.

4. The composite of claim 1 which contains up to about 10 wt. % of a crosslinking agent.

5. The composite of claim 1 wherein the mica is phlogopite.

6. The composite of claim 4 wherein the crosslinking agent is nitropolyphenylene or sulfonated polyphenylene.

7. The composite of claim 5 containing about 20 to 40 wt. % branched polyphenylene having an inherent viscosity ranging from about 0.05 l to 0.12.

8. The composite of claim 1 wherein the mica has a particle size ranging from about −400 mesh to about 100 mesh.

9. The composite of claim 3 wherein the mica has a particle size ranging from about −400 mesh to about 100 mesh.

10. The composite of claim 5 wherein the mica has a particle size of about −325 mesh.

* * * * *